United States Patent [19]

Wernimont

[11] Patent Number: 4,666,006

[45] Date of Patent: May 19, 1987

[54] WEIGHING STRUCTURE WITH VARIABLE MOMENT LOAD CELLS

[76] Inventor: T. August Wernimont, 2801 Cathmar Ave., Burlington, Iowa 52601

[21] Appl. No.: 834,344

[22] Filed: Feb. 28, 1986

[51] Int. Cl.⁴ .......................... G01G 3/14; G01G 3/08; G01L 25/00; G01L 1/22

[52] U.S. Cl. ................................ 177/211; 177/229; 73/1 B; 73/862.65

[58] Field of Search ............. 177/211, 229, 154, 156, 177/DIG. 9, 128; 73/1 B, 862.65

[56] References Cited

U.S. PATENT DOCUMENTS

| | | | |
|---|---|---|---|
| 4,223,752 | 9/1980 | Belcher | 177/211 |
| 4,258,814 | 3/1981 | Dillon | 177/211 X |
| 4,548,287 | 10/1985 | Matsuura | 177/128 X |
| 4,597,460 | 7/1986 | Wernimont | 177/211 |
| 4,601,356 | 7/1986 | Muccillo, Jr. | 177/211 |

FOREIGN PATENT DOCUMENTS

| | | | |
|---|---|---|---|
| 2406813 | 5/1979 | France | 177/211 |
| 55-29755 | 3/1980 | Japan | 177/211 |

Primary Examiner—George H. Miller, Jr.

[57] ABSTRACT

Multiple methods of constructing weighing platforms using variable moment load cells are disclosed. Variable moment load cells require only a single strain gage and typically four (4) are used on a weighing platform. The output of the four (4) load cells are matched by mechanically varying the bending strain detected by the strain gages.

A method of constructing a load cell to weigh suspended hoppers with a minimum of vertical space is also disclosed.

30 Claims, 22 Drawing Figures

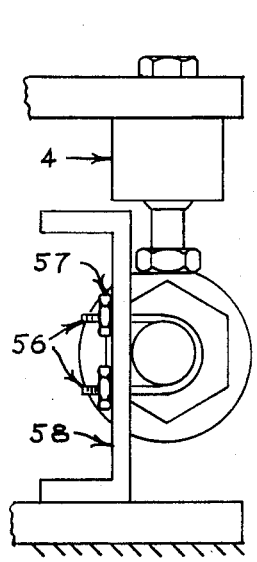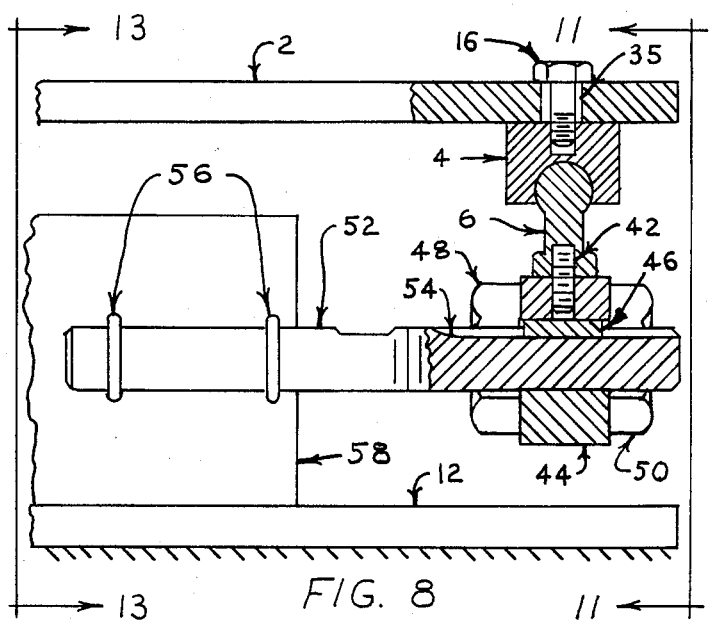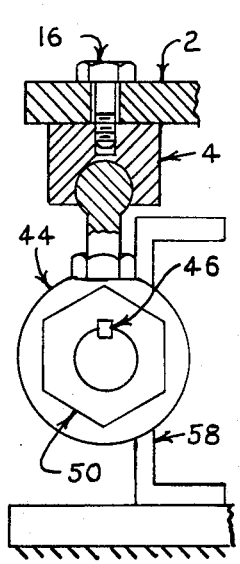
FIG. 10  FIG. 8  FIG. 9
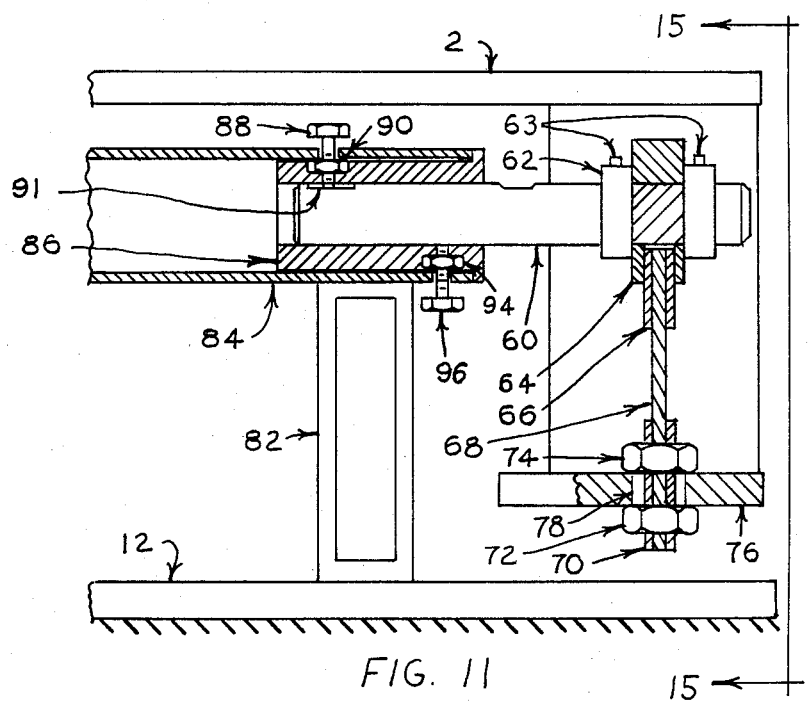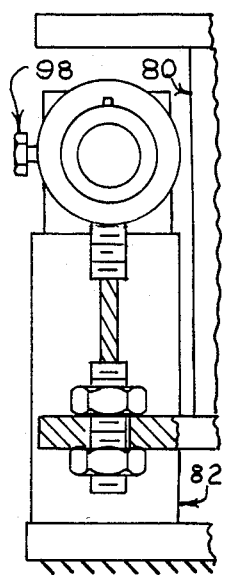
FIG. 11  FIG. 12
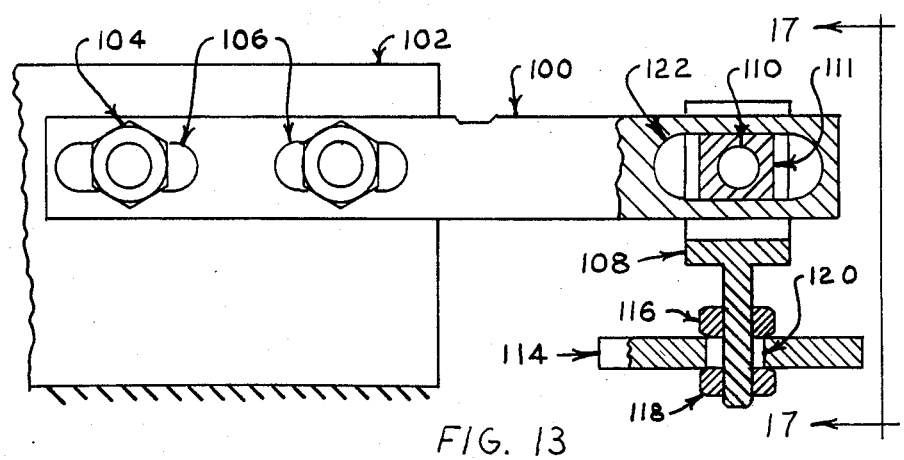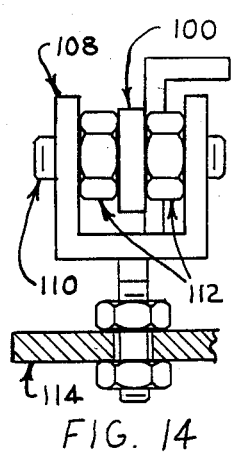
FIG. 13  FIG. 14

WEIGHING STRUCTURE WITH VARIABLE MOMENT LOAD CELLS

BACKGROUND OF THE INVENTION

1. Field of the Invention

This invention pertains to electronic weighing scales and more particularly to load cells using strain gage sensing elements.

2. Description of the Related Art

Electronic weighing scales using strain gage type load cells are well established as documented in Ruge's U.S. Pat. No. 2,815,480 and in Laimins' U.S. Pat. No. 3,512,595.

Wernimont's U.S. Pat. No. 4,597,640 teaches the concept of using four (4) load cells, each with a single strain gage and also teaches a method of mechanically matching the output of the four (4) strain gages by using variable moment load cells in a weighing platform.

SUMMARY OF THE INVENTION

This disclosure expands on the techniques of constructing variable moment load cells and weighing platforms. It also discloses a method of constructing a two (2) load cell weighing apparatus where each load cell has two (2) strain gages. This type of weighing apparatus is suitable for weighing items with two (2) point suspension such as hoppers and caldrons, particularly where there is a minimum amount of vertical clearance for the load cell.

Reducing the number of strain gages used in a weighing scale significantly reduces the material and labor costs to manufacture scales.

BRIEF DESCRIPTION OF THE DRAWINGS

FIG. 8 is a variation of FIG. 2 and FIG. 5 illustrating alternate methods of mounting the load cell and constructing the movable carriage and is partly in section.

FIG. 9 is a detailed view of a movable carriage rotationally secured to the load cell, partly in section and generally along plane 11—11 of FIG. 8.

FIG. 10 is a detailed view of a load cell mounting method using "U" bolts, generally taken along plane 13—13 of FIG. 8.

FIG. 11 is a variation of FIG. 8, partly in section, showing a load cell mounting method using an insert and rectangular tube and is combined with another variation of a movable carriage and vertical supporting member.

FIG. 12 is a detailed view of a cable type vertical supporting member and movable carriage, partly in section, generally taken along plane 15—15 of FIG. 11.

FIG. 13 is a variation of FIG. 8, partly in section, showing alternative methods of constructing the load cell, movable carriage, and vertical supporting member.

FIG. 14 is a detailed view of a yoke type vertical supporting member and movable carriage, partly in section, generally taken along plane 17—17 of FIG. 13.

DETAILED DESCRIPTION OF THE INVENTION

Figure 1:
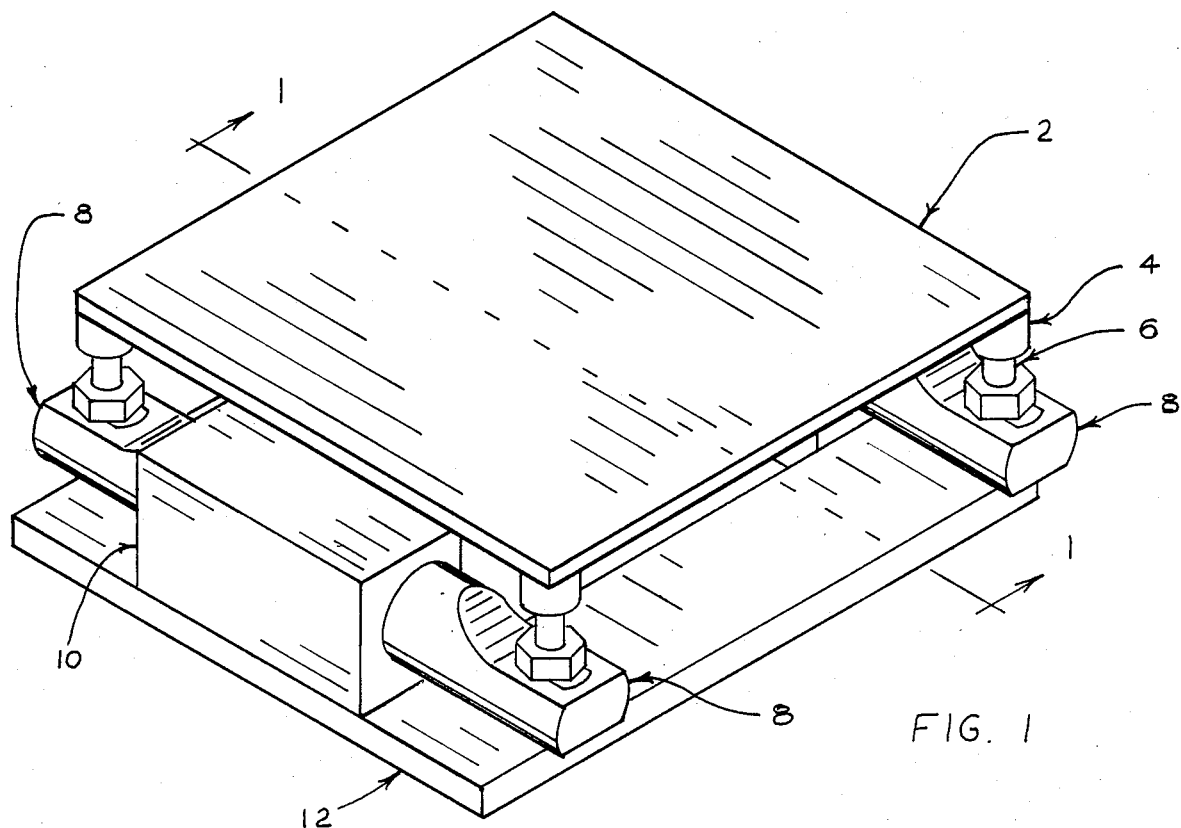
FIG. 1 is a isometric view of a weighing platform supported by four (4) variable moment load cells.

While this invention can be embodied in many different forms, there is shown in the drawings and described in detail, a preferred embodiment of the invention. The present disclosure is to be considered as an exemplification of the principle of the invention and is not intended to limit the invention to the embodiment illustrated.

FIG. 1 illustrates a typical use of variable moment load cells, whereby four (4) load cells 8 are used to support weighing platform 2 through flexible vertical supporting members 4 and 6. Load cells 8 are supported by structure 10 and base 12.

Figure 2:
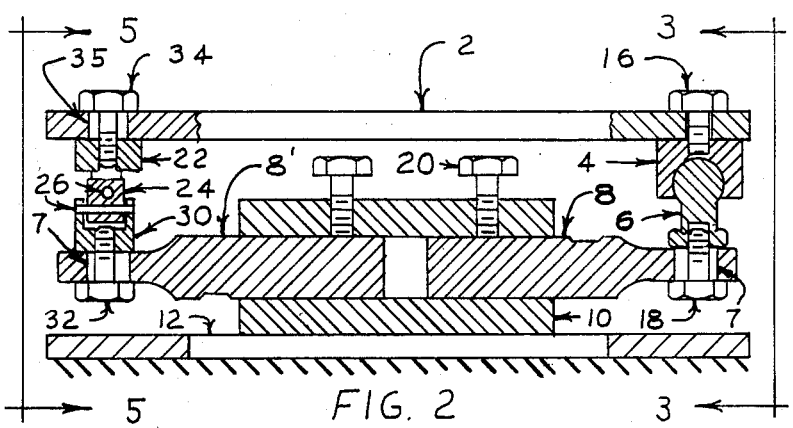
FIG. 2 is a detailed view of the load cells, load cell supports, vertical supporting members, and weighing platforms, partly in section, generally taken along plain 1—1 of FIG. 1.

FIG. 2 illustrates a cross sectional view of two (2) variable moment load cells 8 and 8' and two (2) different types of vertical compression supporting members to connect load cells 8 and 8' to weighing platform 2.

Figure 3:
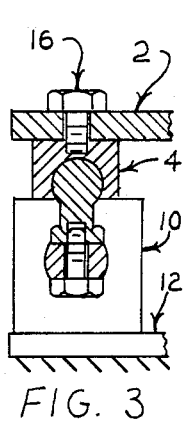
FIG. 3 is a detailed view of a "ball-and-socket" type vertical supporting member, partly in section, generally taken along plane 3—3 for FIG. 2.

The right hand side of FIG. 2, and FIG. 3, illustrates a ball 6, which functions as a movable carriage, and socket 4 type connection used as a compression member to support weighing platform 2. Moving the ball position, which is retained by threaded fastener 18 laterally in slot 7 varies the bending moment detected by the strain gages on load cell 8. When the desired output is achieved, the ball is rigidly secured to load cell 8 by tightening threaded fastener 18. Lateral adjustment of load cell 8 is achieved by loosening threaded fastener 20 and sliding the load cell into or out of support 10 to the desired position and securely clamping it by tightening threaded fastener 20.

Figure 4:
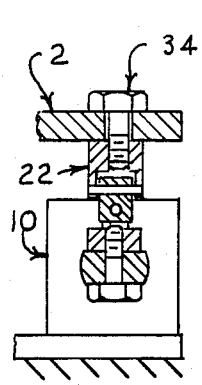
FIG. 4 is a detailed view of a "universal" type vertical supporting member and load cell, partly in section, generally taken along plane 5—5 of FIG. 2.

The left hand side of FIG. 2, and FIG. 4, illustrates a "universal" type connection with base 22 connected to weighing platform 2 with fastener 34 and is further connected to the other "universal" base 30 by means of pins 26 and floating member 24. "Universal" base 30, which functions as a movable carriage, is connected to load cell 8' by means of threaded fastener 32, and is laterally adjustable in slot 7 to increase or decrease the output of load cell 8'. The lateral adjustment needed to vertically align "universal" base 30 with weighing platform 2 is provided by either using slot 35 in the weighing platform or laterally sliding load cell 8' into or out of support 10 where it is secured by tightening threaded fastener 20.

Figure 5:
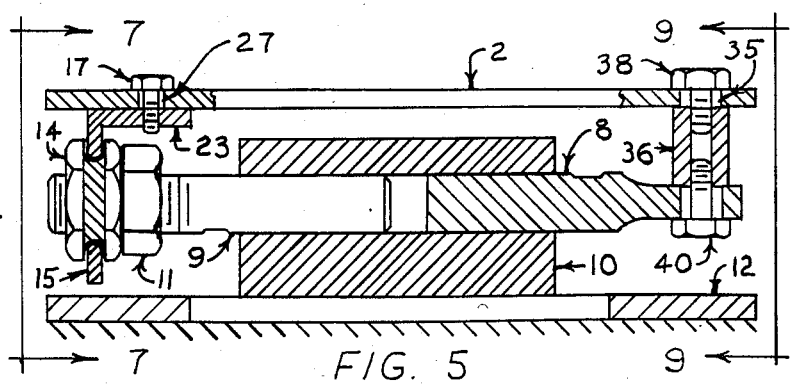
FIG. 5 illustrates a variation of the load cells and vertical supporting member of FIG. 2 and is partly in section.

FIG. 5 illustrates a cross sectional view of two (2) variable moment load cells 8 and 9 and two different types of vertical compression supporting members to connect load cells 8 and 9 to weighing platform 2.

Figure 6:
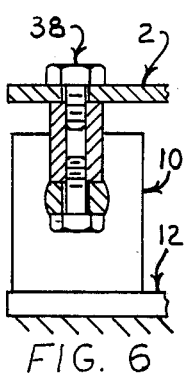
FIG. 6 is a detailed view of a rigid type vertical supporting member and load cell, partly in section, generally along plane 9—9 of FIG. 5.

The right hand side of FIG. 5, and FIG. 6, illustrates a rigid compression supporting member 36, which functions as a movable carriage, and is used to connect weighing platform 2 to variable moment load cell 8. This design is less costly to construct, but requires that deflections of base 10, support 12, load cell 8, and support platform 2, be minimized so that only forces due to the object weight are detected rather than deflections of the support structure.

Figure 7:
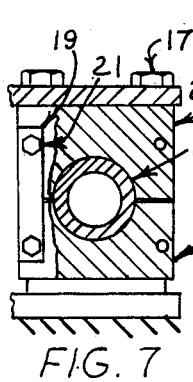
FIG. 7 is a detailed view of a flexible type vertical supporting member, movable carriage, and load cell, partly in section, generally along plane 7—7 of FIG. 5.

The left hand side of FIG. 5, and FIG. 7, illustrates vertical compression supporting member 23 supporting weighing platform 2 on a threadably adjustable carriage configured as collar 14 that is grooved to provide a positive but flexible contact point between compression member 23 and collar 14. Collar 14 is threadably adjustable on load cell 9 and is secured in the desired position by lock nut 11. Lateral adjustment of vertical compression supporting member 23 is provided by slotted hole 27 and threaded fastener 17 which is securely tightened after adjustment of load cell 9. Retainer 15 is connected to vertical compression supporting member 23 by clip 19 and threaded fastener 21 to prevent removal of weighing platform 2 from the scale base 12.

FIG. 8, FIG. 9, and FIG. 10 illustrates variable moment load cell 52 that has a movable carriage configured as collar 44 installed on one end. The collar is prevented from rotating by key 46 that rests in keyway 54 of load cell 52. Moving collar 44 inwardly or outwardly is accomplished by turning nuts 48 and 50 to set the load cell output and then locking it into position when they are tightened.

Ball portion 6 of the swivel connection is secured to collar 44 by stud bolt 42.

Socket portion 4 of the swivel connection is secured to platform 2 by threaded fastener 16 which passes through slotted hole 35 to provide lateral adjustment for the variable length load cell.

Load cell 52 is further fastened to support 58 by use of "U" bolts 56 and nuts 57 to provide lateral adjustment of load cell 52 relative to support 58 and base 12.

FIG. 11, and FIG. 12, illustrates variable moment load cell 60 with a movable carriage configured as collar 64 that is movable inwardly or outwardly on load cell 60 and secured in position by collars 62 and set screws 63. Weighing platform 2 could be suspended below the load cells as suspended platform 76 or raised above the load cells by using spacing member 80.

Suspended platform 76 is attached to movable collar 64 by means of threaded fastener 66 through which cable 68 passes and is secured by use of a suitable adhesive. The other end of cable 68 passes through threaded fastener 70 and is also secured by an adhesive. Cable 68 provides a flexible link to eliminate bending moments that would be induced in a solid link of weighing platform 2, or suspended platform 76, experienced a lateral movement. Preventing lateral movement of platform 76 or 2 by means of suitable stops would allow use of a rigid connection between collar 64 and suspended platform 76.

By judiciously selecting the strength of the adhesive, cable 68, or alternately, a rigid link, the structural connection between load cell 60 and suspended platform 76 can be designed to act as an overload device that would break before the costly load cell was damaged by an excessive weight placed on the weighing platform.

Variable moment load cell 60 is supported by insert 86 that is installed in tube 84 and is further retained by threaded fasteners 88, 96, and 98, which pass through nuts 90 and 94. Tightening threaded fasteners 88 and 96 pushes load cell 60 to the opposite wall by reacting against threaded nuts 90 and 94.

Threaded fastener 88 contacts load cell 60 in notch 91 that prevents rotational movement of the load cell as it is adjusted inwardly or outwardly after its output has been set. Tightening threaded fastener 98 prevents horizontal movement of load cell 60. Support tube 84 is further supported by compression member 82 which is supported by base 12.

Placement of the vertical fasteners 88 and 96 near the bending reaction points causes the reaction forces to be carried primarily by the threaded fastener. Utilizing high strength material such as steel for fasteners 88 and 96 to support the reaction forces directly, permits using of lower strength materials such as engineering plastics for insert 86. Using engineering plastics in combination with nonmetallic fasteners provides an electrically insulated load cell which is important in scales that are field welded.

By using stainless steel load cell supporting members, which are costly, an insert of a non-corrosive material, such as an engineering plastic, stainless steel fasteners, and a thin wall stainless steel supporting tube, a corrosion resistant load cell support and load cells can be constructed at minimum cost.

FIG. 13 and FIG. 14 illustrate variable moment load cell 100 attached to support 102 by threaded fasteners 104 that are laterally adjustable in slotted hole 106, or alternately with the slotted holes installed in support 102. Weighing platform 114 is attached to yoke 108 that is supported by carriage pin 110 and captive support member 111, that is movable in slot 122 to vary the bending moment detected by load cell 100. Carriage pin 110 is securely held in position by tightening threaded fasteners 112.

Figures 15, 16:
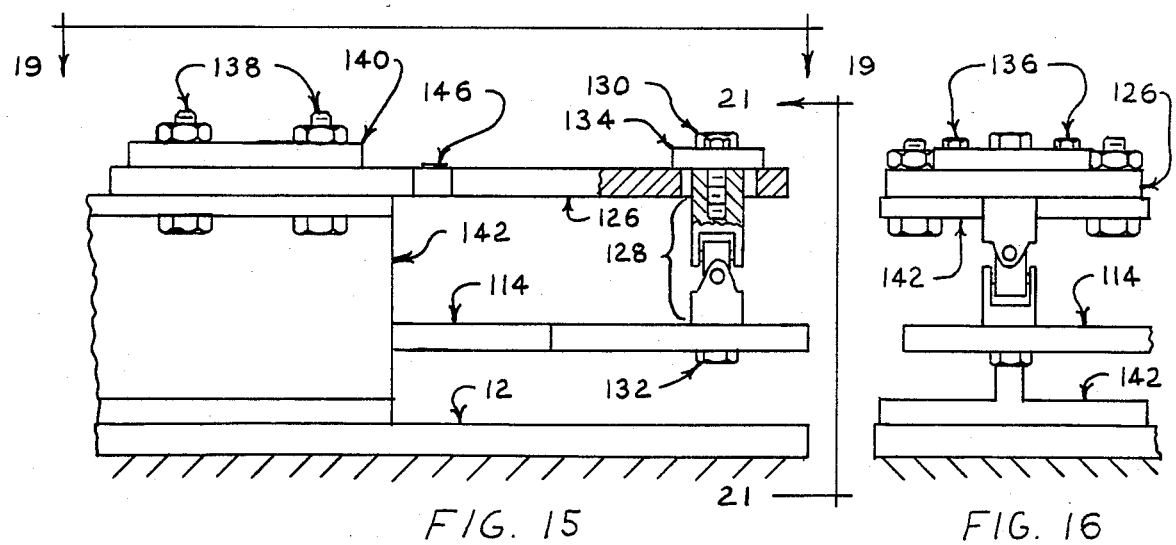
FIG. 15 is a variation of FIG. 8, partly in section, illustrating alternative methods of constructing the load cell, support, and movable carriage.
FIG. 16 is a detailed view of the movable carriage and vertical supporting member, generally taken along plane 21—21 of FIG. 15.
Figure 17:
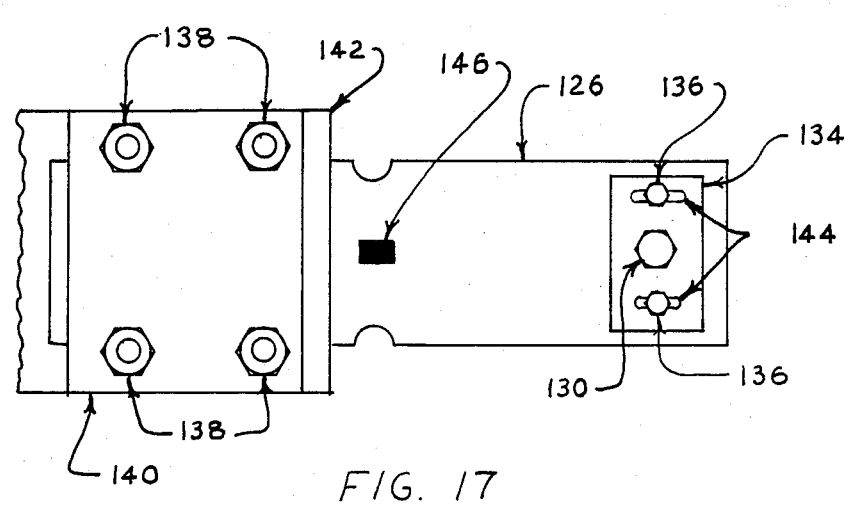
FIG. 17 is a detailed view of a load cell mounting method and movable carriage, generally taken along plane 19—19 of FIG. 15.

FIG. 15 and FIG. 16 illustrates variable moment load cell 126 with strain gage 146 attached and further supporting carriage 134 which is attached to "universal" type vertical supporting member 128 by threaded fastener 130. FIG. 17 illustrates carriage 134 is movable to increase or decrease the output of load cell 126 and is securely held in position by tightening threaded fasteners 136 which pass through slots 144. "Universal" vertical supporting member 128 is further attached to suspended weighing platform 114 by means of threaded fastener 132. Load cell 126 is supported by "I" beam support 142 and is secured in position by plate 140 which is securely clamped by threaded fasteners 138 after lateral adjustments are made. Support 142 is further supported by base 12.

Figure 18:
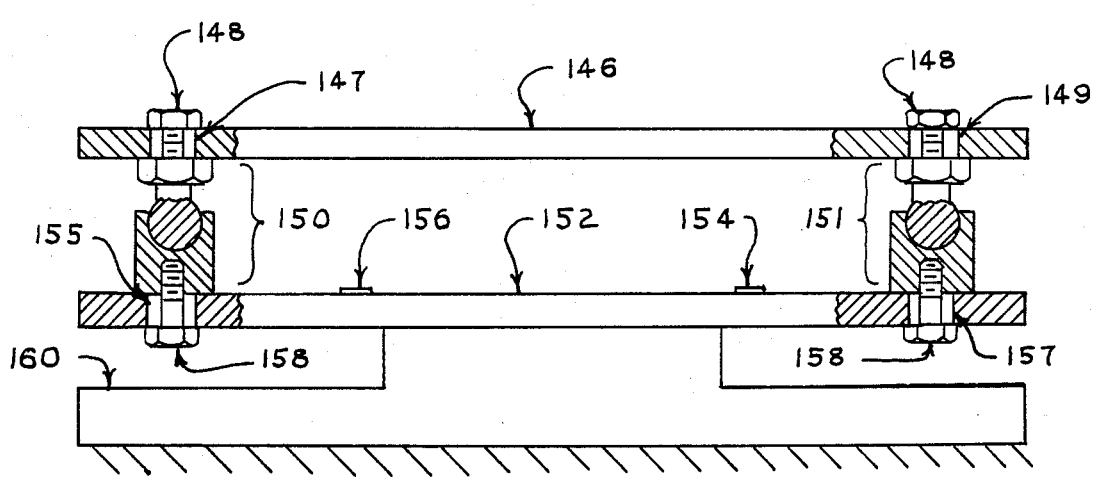
FIG. 18 illustrates a single load cell structural member with an independent load cell, movable carriage and vertical supporting member on each end, and is partly in section.

FIG. 18 illustrates a double variable moment load cell 152 which has strain gages 154 and 156 attached whose outputs are independently adjustable by moving swivel assemblies 150 and 151 in slots 155 and 157 respectively. Loosening threaded fasteners 148, which pass through slotted holes 147 and 149 allow the output of the load cells to be adjusted and then tightening threaded fasteners 148 securely connects swivels 150 and 151 to weighing platform 146. The electrical circuit for this load cell requires two (2) strain gages in tension as shown in FIG. 18 and also two (2) gages in compression which are not shown. The compression strain gages can be obtained by taking a load cell similar to the one shown in FIG. 18 and turning it over so that the strain gages are on the bottom side of the load cell supporting member where they will detect compressive strain. The strain gages could also be installed so that the strain gage on one (1) end of the load cell experience tension while the strain gages on the other end experience compression.

The load cell supporting member shown in FIG. 18 could be further incorporated into a complete full bridge load cell by adding two (2) compression gages under gages 154 and 156. This configuration makes the load cell suitable to be suspended in the midsection so the ends could support suspended loads such as hoppers and kettles where there is minimum overhead clearance for a load cell.

Figure 19:
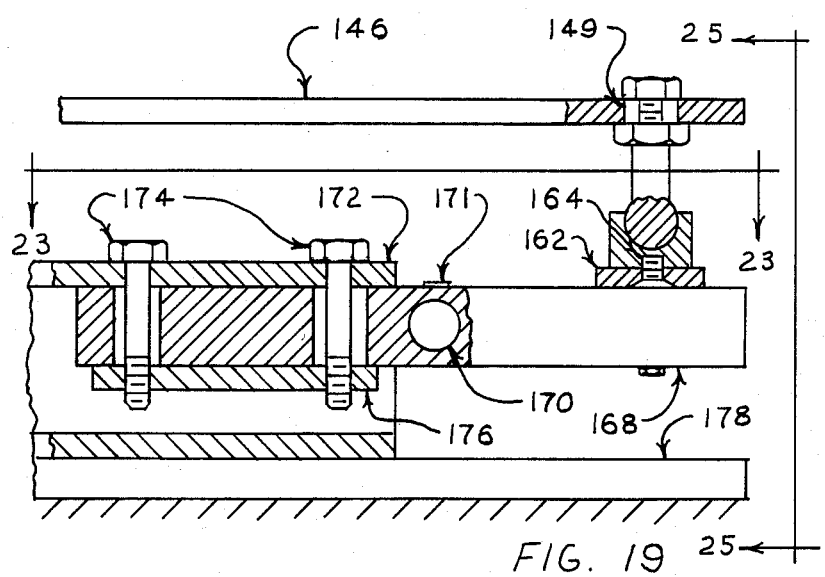
FIG. 19 is a variation of FIG. 15 illustrating alternative methods of constructing the load cells, supports, and movable carriage.
Figure 20:
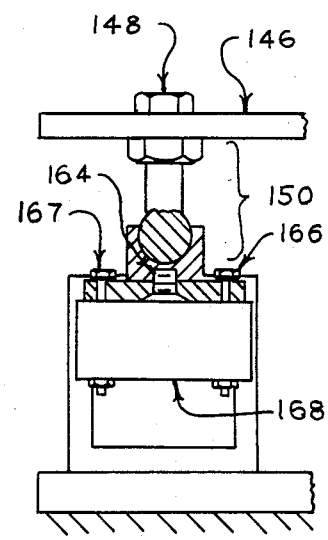
FIG. 20 is a detailed view of the load cell, movable carriage, and vertical supporting member, partly in section, generally taken along plane 25—25 of FIG. 19.
Figure 21:
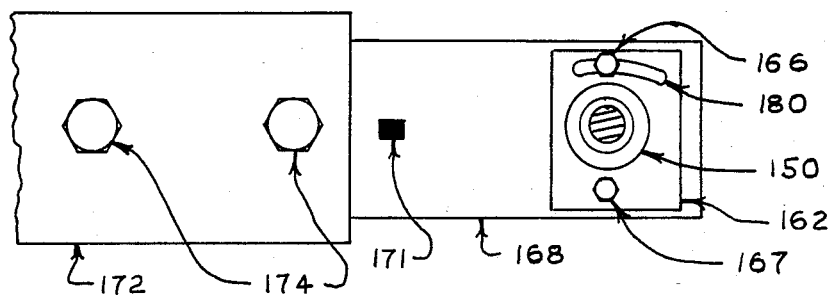
FIG. 21 is a detailed view of the load cell mounting method and movable carriage, generally taken along plane 23—23 of FIG. 19.

FIG. 19 and FIG. 20 illustrate variable moment load cell 168 supporting movable carriage 162 which is secured to swivel assembly 150 by threaded fastener 164. Swivel 150 is further secured to weighing platform 146 by threaded fastener 148 which passes through slotted hole 149 and provides adjustment of the weighing platform relative to load cell 168. Movable carriage 162 is secured to load cell 168 by threaded fasteners 166 and 167 as illustrated in FIG. 21. Threaded fastener 166 passes through arcuate slot 180 which allows precise adjustment of the load cell output by providing a gradual change in the bending moment as carriage 162 pivots around fixed fastener 167.

Load cell 168 has strain gage 171 positioned in a weaken area over hole 170 to increase the strain detected and is further supported by rectangular tube 172 by means of threaded fasteners 174 and threaded member 176. Rectangular tube 172 is further supported by base 178.

Figure 22:
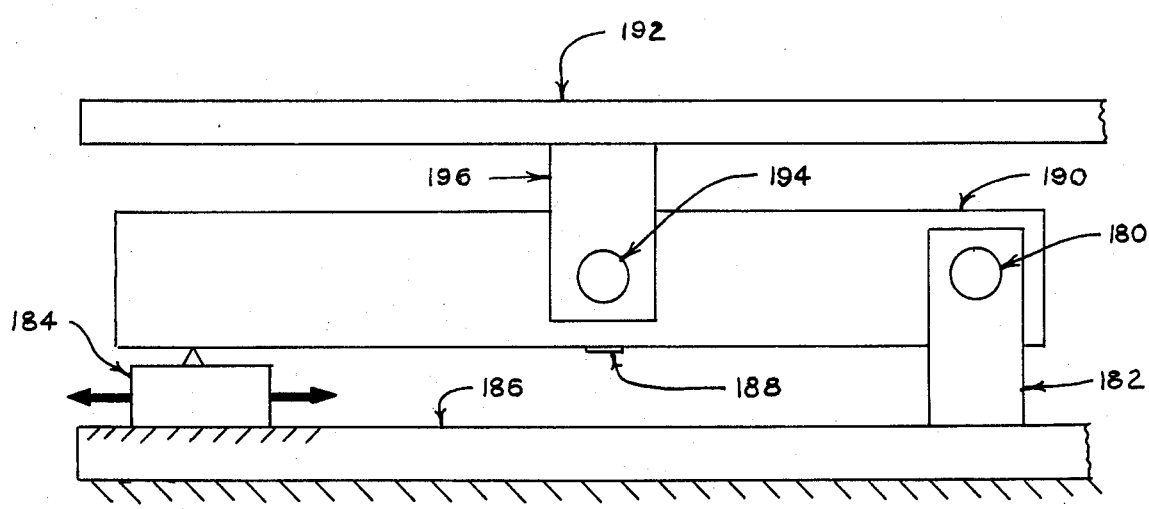
FIG. 22 is a side view of variable moment load cell illustrated as a beam supported on both ends rather than as a cantilevered beam.

FIG. 22 illustrates variable moment load cell 190 supported by vertical support 182 and pin 180 on one end and by movable carriage 184 on the opposite end. Moving support 184 longitudinally relative to load cell 190 increases or decreases the bending moment detected at strain gage 188. Weighing platform 192 is supported by support pin 194 and support member 196.

Either one or both end supports of the load cell could be movable using any of the methods illustrated in FIG. 2 through FIG. 19. Placement of the strain gage(s) at the platform support attaching point produces the highest strain values. Also attaching the platform support and strain gage(s) nearer to one end support causes the movable support nearest to the strain gage to act as a course adjustment when it is moved, while the movable support farthest from the strain gage will act as a fine adjustment thereby facilitating setting the desired output on the load cell.

I claim:

1. A weighing structure comprised of:

a. A support base capable of supporting a plurality of variable moment load cells where the structural member of the load cell is supported by a load cell support in an essentially horizontal position, and where,
   b. the variable moment load cell structural member supports a movable carriage that can be positioned and secured in an infinite number of positions along the longitudinal axis of the load cell within its adjustment range and where,
   c. the movable carriage on the structural member of the load cell is further attached to a vertical supporting member that supports the weighing platform and where,
   d. a means is provided to adjust the distance between the variable moment load cell support on the base and the weighing platform over an infinite number of positions within the longitudinal adjustment range of the variable moment load cells.

2. A weighing structure as in claim 1, in which the load cell support is comprised of a solid member with a substantially horizontal hole through which the structural member of the load cell can fit and which is further supported by the base and where the said means of adjusting the distance between the load cell support and the weighing platform is accomplished by sliding the variable moment load cell along its longitudinal axis and securing it with transverse set screws.

3. A weighing structure as in claim 1, in which the load cell supports are comprised of inserts that adapt smaller size load cells to a larger size tube and where the said means of adjusting the distance between the load cell supports and the weighing platform is accomplished by sliding the variable moment load cells along its longitudinal axis inside the inserts and where the load cells are secured by transverse threaded fasteners that pass through a transverse hole in the tube wall and through an internal threaded member and bear against the load cell structural member when it is tightened to secure the load cell to the support tube and where the tube is further supported by the base.

4. A weighing structure as in claim 1, in which the load cell supports are comprised of inserts that adapt a smaller size load cell to a larger size tube and where the said means of adjusting the distance between the load cell supports and the weighing platform is accomplished by sliding the variable moment load cell along its longitudinal axis inside the inserts and where the load cells are secured by transverse threaded fasteners that pass through a transverse threaded hole in the tube wall and bear against the load cell structural member when it is tightened to secure the load cell to the support tube and where the tube is further supported by the base.

5. An insert and threaded fastener as in claim 3, in which the insert and threaded fasteners are constructed electrically insulating material.

6. An insert and threaded fastener as in claim 4, in which the insert and threaded fasteners are constructed of electrically insulating material.

7. A weighing structure as in claim 1, in which the means of attaching the structural member of the load cell to the load cell support is comprised of multiple "U" bolts clamping a circular load cell to the support where the load cell structural member is rotationally prevented from turning when the "U" bolts are loosened by a flat area that bears against the load cell support and where the means of adjusting the distance between the load cell supports and the weighing platform is accomplished by sliding the variable moment load cell along its longitudinal axis and securing it by tightening the "U" bolts.

8. A weighing structure as in claim 1, in which the means of attaching the structural member of the load cell to the load cell support is comprised of plate(s) and threaded fasteners that clamp the load cell to the support and where the means of adjusting the distance between the load cell supports and the weighing platform is accomplished by sliding the variable moment load cell along its longitudinal axis and securing it by tightening the threaded fasteners.

9. A weighing structure as in claim 1, in which the means of attaching the structural member of the load cell to the load cell support is comprised of threaded fasteners that pass through slotted holes in the load cell and clamp the load cell to the support and where the means of adjusting the distance between the load cell supports and the weighing platform is accomplished by sliding the variable moment load cell along its longitudinal axis and securing it by tightening the threaded fasteners.

10. A weighing structure as in claim 1, in which the means of attaching the structural member of the load cell to the load cell support is comprised of threaded fasteners that pass through slotted holes in the support and clamp the load cell to the support and where the means of adjusting the distance between the load cell supports and the weighing platform is accomplished by sliding the variable moment load cell along its longitudinal axis and securing it by tightening the threaded fasteners.

11. A weighing structure as in claim 1, in which the variable moment load cells are each comprised of a structural member supported as a cantilevered beam in a substantially horizontal position and to which one (1) or more strain gages are attached in its midsection to detect bending strains and where the unsupported end has a movable carriage that can be moved to an infinite number of positions within its adjustment range along the longitudinal axis of the load cell and where the movable carriage is securely attached to the load cell and a vertical supporting member.

12. A weighing structure as in claim 1, in which two variable moment load cells are combined into a single structural member supported substantially horizontal in its midsection and where the two (2) unsupported ends have one (1) or more strain gages attached to detect bending strains and where the extreme ends of the structural member are further affixed with a movable carriage that can be moved to an infinite number of positions within its adjustment range along the longitudinal axis of the load cell and where the movable carriage is securely attached to the load cell and a vertical supporting member and where the means of adjusting the distance between the load cell support and the weighing platform is accomplished by sliding the weighing platform suports along slotted holes in the weighing platform supports and securing them with threaded fasteners.

13. A weighing structure as in claim 1, in which the variable moment load cells are each comprised of a structural member supported substantially horizontal at both ends and where one (1) or both end supports are carriages that are movable to an infinite number of positions within its adjustment range along the longitudinal axis of the load cell to increase or decrease the bending strain detected by one (1) or more strain gages installed on the midsection of the load cell and where the vertical supporting member is also attached to a movable carriage between the two (2) end supports and can be moved to an infinite number of positions within its adjustment range and is supported by the load cell structural member and is further attached to the weighing platform support.

14. A weighing structure as in claim 1, in which the movable carriage is the base of a "ball-and-socket" type swivel assembly and is fastened to the structural member of the load cell.

15. A weighing structure as in claim 1, which the movable carriage is a collar on the structural member of the load cell that is longitudinally secured and further contains a groove of reduced section that engages the vertical supporting member to flexibly connect the vertical supporting member with the structural member of the load cell.

16. A weighing structure as in claim 1, in which the movable carriage is a collar that is rotationally loose on the structural member of the load cell and is secured in the longitudinal position on the load cell and is further connected to the vertical supporting member.

17. A weighing structure as in claim 1, in which the movable carriage is a collar that is rotationally and longitudinally secured on the structural member of the load cell and is further connected to the vertical supporting member.

18. A weighing structure as in claim 1, in which the movable carriage is a threaded fastener that is installed in a slotted hole in the structural member of the load cell and where moving the threaded fastener in the slotted hole provides an infinitely variable means of setting the output of the load cell.

19. A weighing structure as in claim 1, in which the movable carriage is a plate containing slotted hole(s) through which threaded fasteners are passed and secured to the load cell structural member and where moving the plate along the longitudinal axis of the load cell provides an infinitely variable means of setting the output of the load cell.

20. A weighing structure as in claim 1, in which the structural member of the load cell is threaded and the movable carriage is longitudinally adjustable by turning threaded fasteners on the threaded structural member of the load cell to move the carriage to the desired position 21. A weighing structure as in claim 1, in which the movable carriage is comprised of a pin that is passed through another load carrying member that is further contained in a slotted hole in the structural member of the load cell and is longitudinally secured to the load cell.

22. A weighing structure as in claim 1, in which the movable carriage is secured in the desired position by locking collars secured to the structural member of the load cell.

23. A weighing structure as in claim 1, in which the infinitely variable movable carriage is secured in the desired position on the structural member of the load cell by tightening threaded fasteners.

24. A weighing structure as in claim 1, in which the vertical supporting member between the movable carriage on the load cell and weighing platform is comprised of a "ball-and-socket" type swivel assembly.

25. A weighing structure as in claim 1, in which the vertical supporting member between the movable carriage on the load cell and the weighing platform is comprised of a solid member that rests in a groove in the movable carriage and is retained on the carriage by a removable retainer, and where the solid member is further attached to the weighing platform.

26. A weighing structure as in claim 1, in which the vertical supporting member between the movable carriage on the load cell and the weighing platform is comprised of a yoke that is connected to the movable carriage and weighing platform.

27. A weighing structure as in claim 1, in which the vertical supporting member between the movable carriage on the load cell and weighing platform also provides overload protection for the load cells when comprised of a flexible cable with a fastener secured to each end with an adhesive, whereby the breaking strength of the adhesive provides overload protection for the load cell.

28. A weighing structure as in claim 27, in which the flexible cable is replaced with a solid link.

29. A weighing structure as in claim 1, in which the means of connecting the vertical supporting member to the weighing platform is by means of threaded fasteners that passes through slotted holes in the weighing platform and provides a means of adjusting the distance between the load cell supports and the weighing platform.

30. A weighing structure as in claim 1 in which the load cell supports are electrically insulated from the structural member of the load cells.

* * * * *